United States Patent [19]

Grundmann et al.

[11] Patent Number: 5,093,775
[45] Date of Patent: Mar. 3, 1992

[54] MICROCODE CONTROL SYSTEM FOR DIGITAL DATA PROCESSING SYSTEM

[75] Inventors: William R. Grundmann, Hudson; Raymond F. Boucher, Boylston; Tryggve Fossum, Northboro, all of Mass.

[73] Assignee: Digital Equipment Corporation, Maynard, Mass.

[21] Appl. No.: 549,611

[22] Filed: Nov. 7, 1983

[51] Int. Cl.$^5$ .................. G06I 15/16; G06I 9/38
[52] U.S. Cl. .................. 395/375; 364/231.8; 364/228.6; 364/Dig. 1; 395/800
[58] Field of Search ... 364/200 MS File, 900 MS File, 364/748

[56] References Cited

U.S. PATENT DOCUMENTS

| | | | |
|---|---|---|---|
| 3,651,482 | 3/1972 | Benson et al. | 340/172.5 |
| 3,771,138 | 11/1973 | Celtruda et al. | 364/200 |
| 3,787,673 | 1/1974 | Watson et al. | 364/200 |
| 3,814,925 | 6/1974 | Spannagel | 364/748 |
| 3,871,578 | 3/1975 | Van De Goor | 364/748 |
| 3,875,391 | 4/1975 | Shapiro et al. | 364/200 |
| 4,025,771 | 5/1977 | Lynch et al. | 364/200 |
| 4,075,688 | 2/1978 | Lynch et al. | 364/200 |
| 4,112,489 | 9/1978 | Wood | 364/200 |
| 4,159,519 | 6/1979 | Gupta | 364/200 |
| 4,161,784 | 7/1979 | Cushing | 364/200 |
| 4,174,514 | 11/1979 | Sternberg | 364/200 |
| 4,225,920 | 9/1980 | Stokes | 364/200 |
| 4,228,497 | 10/1980 | Gupta | 364/200 |
| 4,270,181 | 5/1981 | Tanakura et al. | 364/200 |
| 4,338,675 | 7/1982 | Palmer et al. | 364/200 |
| 4,354,228 | 10/1982 | Moore et al. | 364/200 |
| 4,534,010 | 8/1985 | Kobayashi et al. | 364/748 |

FOREIGN PATENT DOCUMENTS 0089469  9/1983  European Pat. Off.

OTHER PUBLICATIONS

Computer, vol. 15, No. 3, Mar. 1982, pp. 43–54, IEEE, Long Beach, Calif.; Budzinski et al.: "A Restructurable Integrated Circuit for Implementing Programmable Digital Systems".

IEEE Transactions on Computers, vol. C-32, No. 4, Apr. 1983, pp. 370–377, IEEE, New York; M. S. Cohen et al.: "CADAC: A Controlled-Precision Decimal Arithmetic Unit".

JP Patent Publication No. 56-19152.

Primary Examiner—David Y. Eng

[57] ABSTRACT

A microcode control system for a digital data processor. The processor sequentially processes data in response to a microinstruction in a data processing path including a plurality of successive processing stages. A control path parallels the data processing path and includes a plurality of stage which transfer the microinstruction in synchronism with the transfer of data through the data processing path. At each stage in the control path, the microinstruction is decoded to determine the operation to be performed in response thereto on the data by the stage in the data processing path, and control signals are generated to control the processing by the stage in the data processing path.

20 Claims, 3 Drawing Sheets

MICROCODE CONTROL SYSTEM FOR DIGITAL DATA PROCESSING SYSTEM

BACKGROUND OF THE INVENTION

1. Field of the Invention

The invention relates generally to the field of digital data processing systems, and more specifically to microcoded systems for controlling a central processing system in execution of program instructions. In particular, the invention provides a system for the sequential serial decoding of a microinstruction to control successive phases in execution of a microinstruction, to avoid the necessity of requiring each microinstruction to explicitly control every function of the processor at one time. Since the microinstructions are successively decoded at the various processing stages to control those stages, each microinstruction will require fewer binary control signals, thereby reducing the number of microwords required as well as the length of each microinstruction.

2. Description of the Prior Art

A digital data processing system generally includes three basic elements; namely, a memory element, an input/output element, and a processor element, all interconnected by one or more buses. The memory element stores data in addressable storage locations. This data includes both operands and instructions for processing the operands. The processor element causes data to be transferred, or fetched, to it from the memory element, interprets the incoming data as either instructions or operands, and processes the operands in accordance with the instruction. The results are then stored in addressed locations in the memory element. An input/output element also communicates with the memory element in order to transfer data into the system and to obtain the processed data from it. Units comprising the input/output element normally operate in accordance with control information supplied to it by the processor element. The input/output units may include, for example, printers, teletypewriters or keyboards and video display terminals, and may also include secondary data storage devices such as disk drives or tape drives.

Processors process programs by executing a series or program instructions. Each program instruction includes an operation code which identifies the operation to be performed. In addition, an instruction may include one or more operands which are to be used by the processor in executing the instruction. Each instruction, however, requires the processor to perform one or more steps to execute the operation. In the past, the control of the processor in executing these steps has been achieved in two ways. First, control has been achieved by combinatorial logic. The operation code portion of the instruction enables certain data paths in the processor to be established, as well as a combinatorial logic control path. During each of a plurality of processing cycles, the combinatorial logic control path determines the results of processing in the previous processing cycle and transmits control signals to the data path to enable it to perform a processing operation.

The second control arrangement is by way of microinstructions. Microinstructions are entirely analogous to program instructions or "macroinstructions" which are fetched from memory, and consists of a series of control words. Each macroinstruction operation code identifies one series of microinstructions. During each processing cycle, the processor enables the successive control words in the series associated with the macroinstruction being processed to be retrieved and transmitted to the data path. Each microinstruction contains binary signals which control all of the controllable functions in the data path during that processing cycle. The results of previous processing cycles, and various other conditions in the execution of the instruction, are taken into account by branching within the microinstruction series. The processor generates branching or condition signals which enable the different portions of the microinstruction series to be used depending on conditions which are sensed during processing of the instruction.

Problems inhere in both types of control arrangements. With the combinatorial logic control path, the control path is hardwired into the processor, and a substantial redesign effort is required to change the control path. If a design error is detected in the combinatorial logic control path during development or after a processor has been manufactured or sold, correction thus can be an expensive and time-consuming process.

A combinatorial logic control system can be faster than microinstruction-controlled systems, but the use of microinstructions can make correction of design errors in the control system far simpler. All the designer need do is revise the microinstruction series if an error is detected, generate a new microinstruction control store, which can be in a field-programmable read-only memory, and replace the old control store with a new one. However, generally microcode control arrangements require a very long microword in which digital control signals are required for each function in the data path, as well as a connection from the control store to the circuit in the data path which performs that function.

Because of the ease in finding and correcting errors, the use of microinstructions to control a processor's data paths has become the most common control system used today. However, because of the number of digital control signals required in the microinstructions, the number of connections between the microinstruction control store and the data path can be substantial.

SUMMARY OF THE INVENTION

The invention provides a new microcode control arrangement which reduces the number of control bits required in a microinstruction to control the data path, and accordingly reduces the number of connections between the processor's control path and its data processing path.

In brief summary, a processor processes data words in a plurality of processing cycles. A data processing path includes a plurality of processing stages connected serially, with each of the successive processing stages processing a data word during a cycle. A control path also comprises a plurality of stages, each of which is associated with a processing stage in the data processing path. The successive stages of the control path receive a microinstruction from a preceding stage contemporaneously with the receipt by the corresponding storage in the data processing path of the data word on which the microinstruction controls processing. Each stage in the control path stage includes a decoder which decodes the microinstruction and enables its associated stage in the data path to perform certain a processing operation which depends on the microinstruction.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DESCRIPTION OF THE PREFERRED EMBODIMENTS

Figure 1:
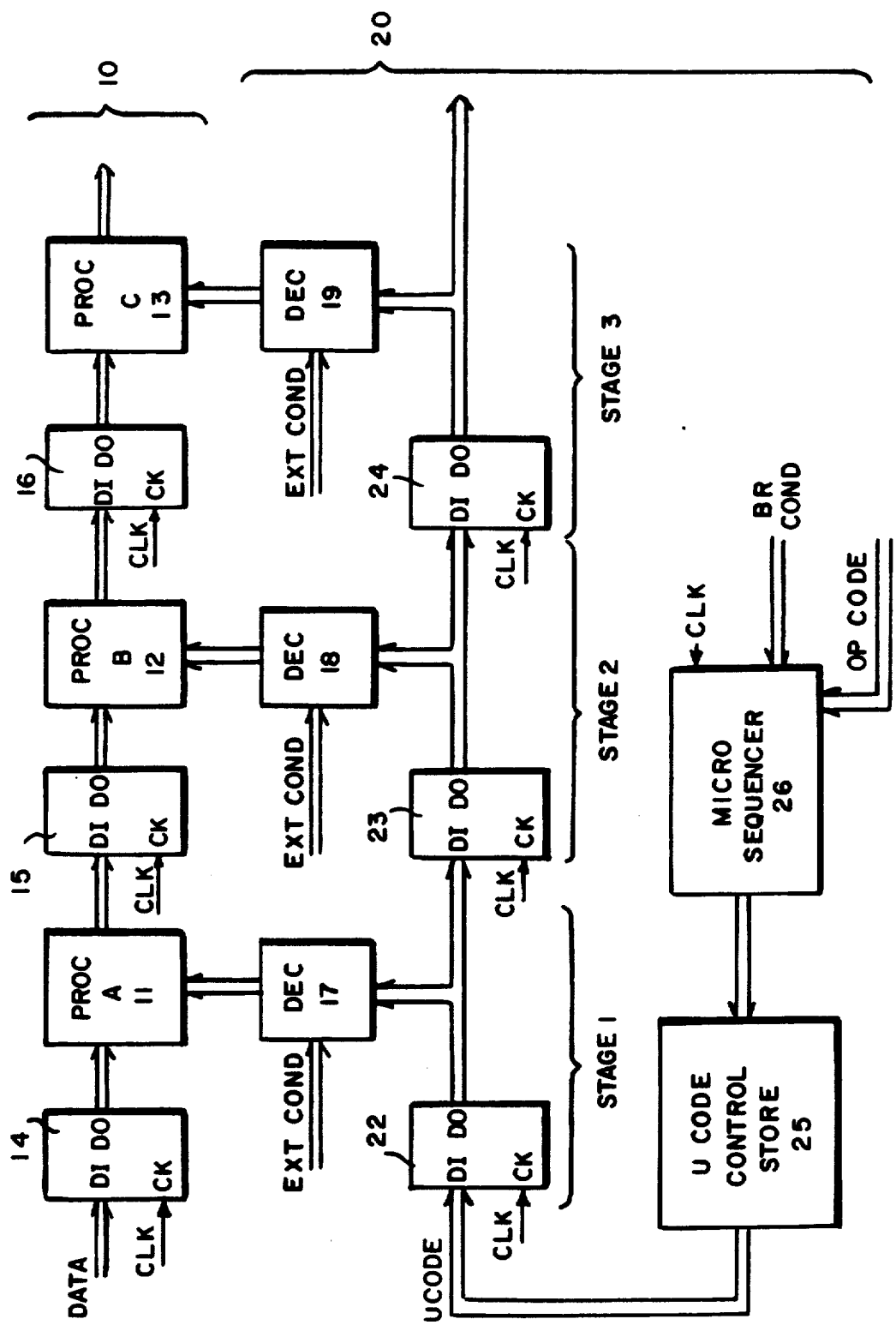
FIG. 1 is a block diagram of a processor circuit illustrating the invention.

FIG. 1 depicts a processing circuit which processes a word of data in accordance with a microinstruction in a sequence of processing steps, each performed in a processing stage during a processing cycle defined by CLK timing signals. The microinstruction identifies the sequence of operations in which the data word is to be processed. The data processing circuit includes a data processing path 10 which processes the data word in accordance with control signals from a control path 20. The data processing path 10 includes a series of processors 11, 12 and 13 each of which perform a step in processing the instruction. The data is initially stored in an upstream latch 14 and coupled to processor 11 for processing during an initial processing cycle. At the end of the initial processing cycle, the processed data word is latched in a latch 15. This process repeats in processor 12 and latch 16 during the next cycle, and may continue in succeeding downstream processors such as processor 13 during successive processing cycles.

Each of the processors 11 through 13 processes data in response to control signals from corresponding connected decoders 17 through 19, which in turn successively receive the microinstruction from latches 22 through 24, during successive stages of processing of the microinstruction. The microinstruction originates from a microcode control store 25, and is selected by a microsequencer 26 in a conventional manner.

In operation, the processing circuit depicted in FIG. 1 processes data words in accordance with a selected one of a number of macroinstructions. Each instruction identifies a microinstruction sequence stored in the microcode control store 25. The microinstruction sequence to be used in processing a particular item of data is selected by the microsequencer 26, partially in response to an OP CODE operation code portion of a macroinstruction. The microinstruction are then successively transmitted by the control store 25 and initially latched in latch 22 during each processing cycle. Branches may occur in the microinstruction sequence in response to BR COND branch condition signals from other circuits (not shown) in the processing circuit depicted in FIG. 4. Such branch condition signals may also be generated by the processors 11, 12 or 13. Branching conditions which vary a microinstruction sequence are well-known in the art.

Simultaneously, with the transfer of a microinstruction to latch 22 the data word to be processed in conjunction with the microinstruction is latched in latch 14. Both the microinstruction and the data are latched in the respective latches 14 and 22 in response to the CLK timing signal. After the microinstruction is latched in latch 22, the microinstruction is decoded in a decoder 17. The decoder determines the operations to be performed by processing circuit 11 and generates control signals which enable these operations to occur. The operations may depend on certain external conditions, and decoder 17 receives EXT COND external conditions signals which indicate those conditions.

The results of the processing by processor 11 are latched in latch 15 in response to a CLK timing signal. Simultaneously, the contents of latch 22 are latched in latch 23. Processing circuit 12 and decoder 18 operate in a similar manner to processing circuit 11 and decoder 17. The results of the processing by processing circuit 12 are then latched in latch 16 in response to the CLK timing signal. Simultaneously, the microinstruction is shifted to latch 24 to provide decoder 19 with the corresponding microinstruction. Processing circuit 13 then performs the operation required by the control signals from decoder 19 and transmits the results to a succeeding latch (not shown) for further processing, or to an output circuit (also not shown).

It should be noted that the processing circuit depicted in FIG. 1 provides a number of benefits over either combinatorial logic control of a processor or explicit microinstruction control of every processing stage during every processing cycle, as in the prior art. With respect to prior combinatorial logic control, the invention provides an easily changeable microinstruction control of processing, with the microinstruction, stored in microcode control store 25, which can be readily changed as needed to correct errors in design. Decoders 17 through 19 normally will contain combinatorial logic circuits, but, since they are modular, and used only in successive stages, the location and correction of design errors can be greatly simplified over prior combinatorial logic designs.

With respect to prior microinstruction control, in which every function in the data processing path is controlled by the microinstruction during every processing cycle, the invention allows a reduction in the number of control signals required in a microinstruction. Since the decoders 17 through 19 determine the operations to be performed by the different processing modules 11 through 13, in response to the same microinstruction, the number of control signals required to form the microinstruction is reduced accordingly. This also reduces the number of control signals and corresponding wires that would be required between the control store and the processing modules, since normally one control wire and signal would be required for each function controlled from the control store. The reduction in connections, and layout of the processing in successive stages also greatly simplifies the layout and design of the processor 10.

Furthermore, since the processing is performed in stages, the processing can be pipelined, and a new data word can be received in latch 14 during every processing cycle, that is, in response to each the CLK timing signal. The pipelining of the operations of processor 10 speeds up processing in a well-known manner.

Figure 2A:
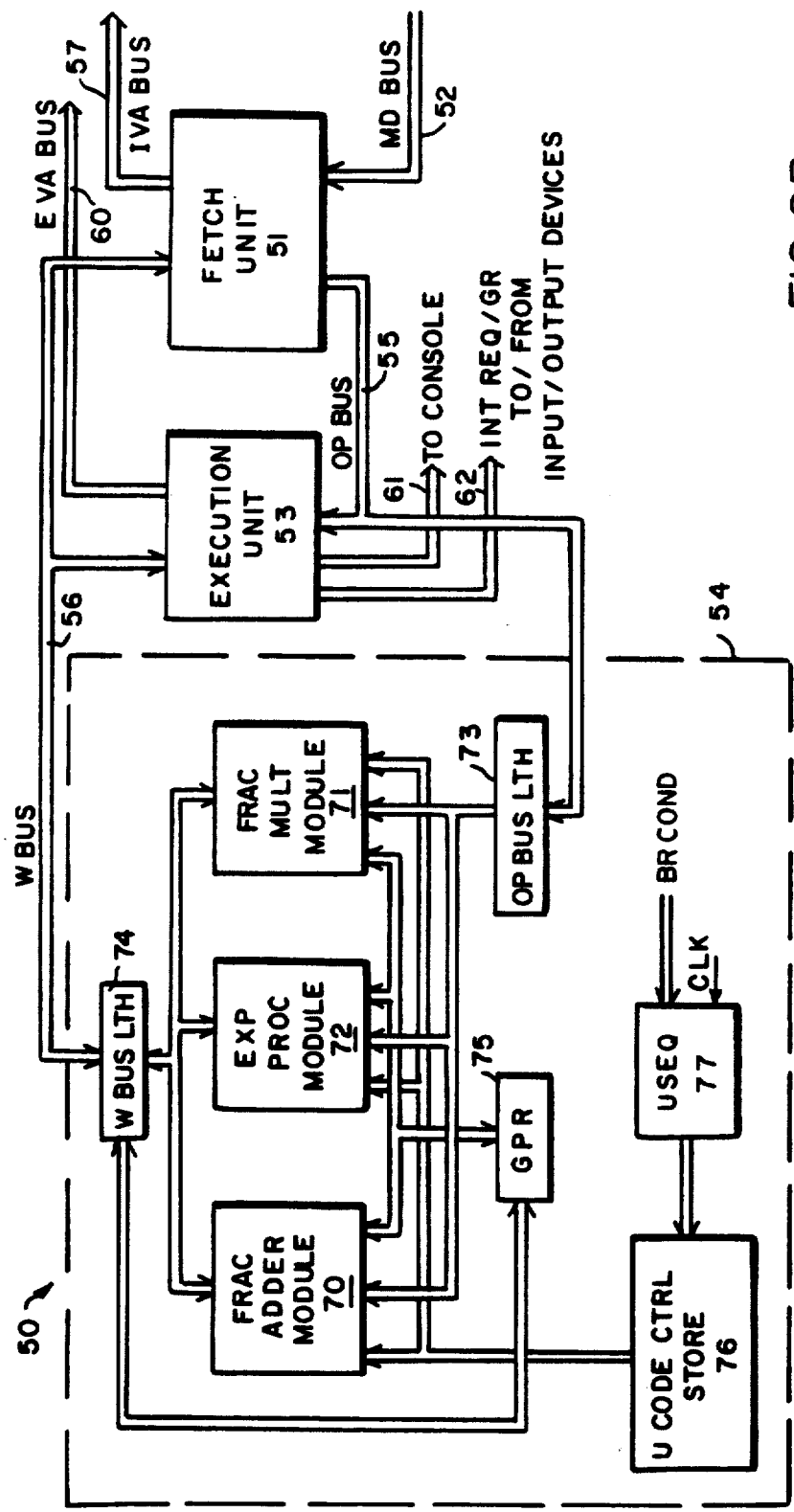
FIG. 2A is a general block diagram of a central processing unit used in a digital data processing system and which incorporates the invention.
Figure 2B:
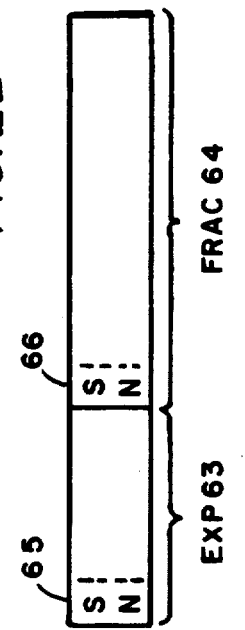
FIG. 2B depicts a data word processed by the central processing unit depicted in FIG. 2A, which is useful in understanding the invention.

An example of how the invention can be used in a central processing unit will now be described in connection with FIGS. 2A, 2B and 3. FIG. 2A illustrates a central processor unit 50 which contains the invention.

The central processor unit 50 is identical to central processor unit contained in U.S. patent application Ser. No. 06/612,621 filed on even date herewith, and reference may be made to that application for details of the operation thereof. In brief, the central processing unit 50 includes a fetch unit 51 and an execution unit 53 which transmit addresses over buses 57 and 60, respectively, to a memory (not shown). Fetch 51 receives instructions from the memory over a memory data bus 52. The fetch unit decodes the instructions, fetches the operands and transmits them to execution unit 53 or to a floating point accelerator 54 over an operand bus 55. The execution unit 53 generally executes the instructions, except for a well-known class of instructions termed "floating point" instructions, which are executed by floating point accelerator 54. The results of the processing are returned to fetch unit 51 over a WRITE bus 56 for storage in the memory over memory data bus 52.

The execution unit 53 is also connected to a console (not shown) over a console bus 61. The console serves as the operator's interface, and allows the operator to examine and deposit instructions and operands, halt the operation of the central processor unit 50, or step the central processor unit through a sequence of instructions and determine its responses thereto. The console also enables an operator to initialize the system through a bootstrap procedure, and perform various diagnostic tests on the entire data processing system.

Finally, the execution unit 53 is also connected over an interrupt request/grant bus 62 to units in an input/output system (not shown) which may include conventional printers, teletypewriters, and keyboards-video display units, as well as disk and tape drives. Bus 62 carries interrupt request signals from the input/output devices to execution unit 53, and interrupt grant signals from the execution unit to the input/output units.

As has been mentioned, the floating point accelerator processor 54 processes floating point instructions. These instructions enable the processor to perform operations on operands in floating point format, which are illustrated in FIG. 2B. A floating point operand includes an exponent portion 63 and a fraction portion 64, each of which includes a sign bit 65 and 66 which identifies the sign of the respective portion 63 and 64 to indicate a positive or negative value. Floating point instructions are generally limited to arithmetic instructions such as addition, subtraction, multiplication, and division, or variations on these instructions. The floating point accelerator processor 54 is provided with two fraction processing data paths, one, addition module 70, performing addition and subtraction, and the other, multiplication module 71, performing multiplications and divisions, on the fraction portion 64 of the operand. An exponent processing module 72 processes the exponent portion 63 of the floating point operand during any of the floating point operations.

The processing modules 70, 71 and 72 receive floating point operands from a number of sources. One source is the operand bus 55, and specifically from an operand bus latch 73. Another source of operands is the WRITE bus 56, and specifically from a WRITE bus latch 74. The third source of operands for the processing logic 70, 71 and 72 is a set of general purpose registers 75 which are maintained in floating point accelerator processor 54. The general purpose registers 75 are loaded through the WRITE bus latch 74 by execution unit 53.

The processing modules 70, 71, and 72 are under control of microinstructions provided by a microcode control store 76 selected by a microsequencer 77 in a conventional manner.

The invention described above in connection with FIG. 1 will now be illustrated in connection with the exponent processing module 72, a portion of which is depicted in greater detail in FIG. 3.

Figure 3:
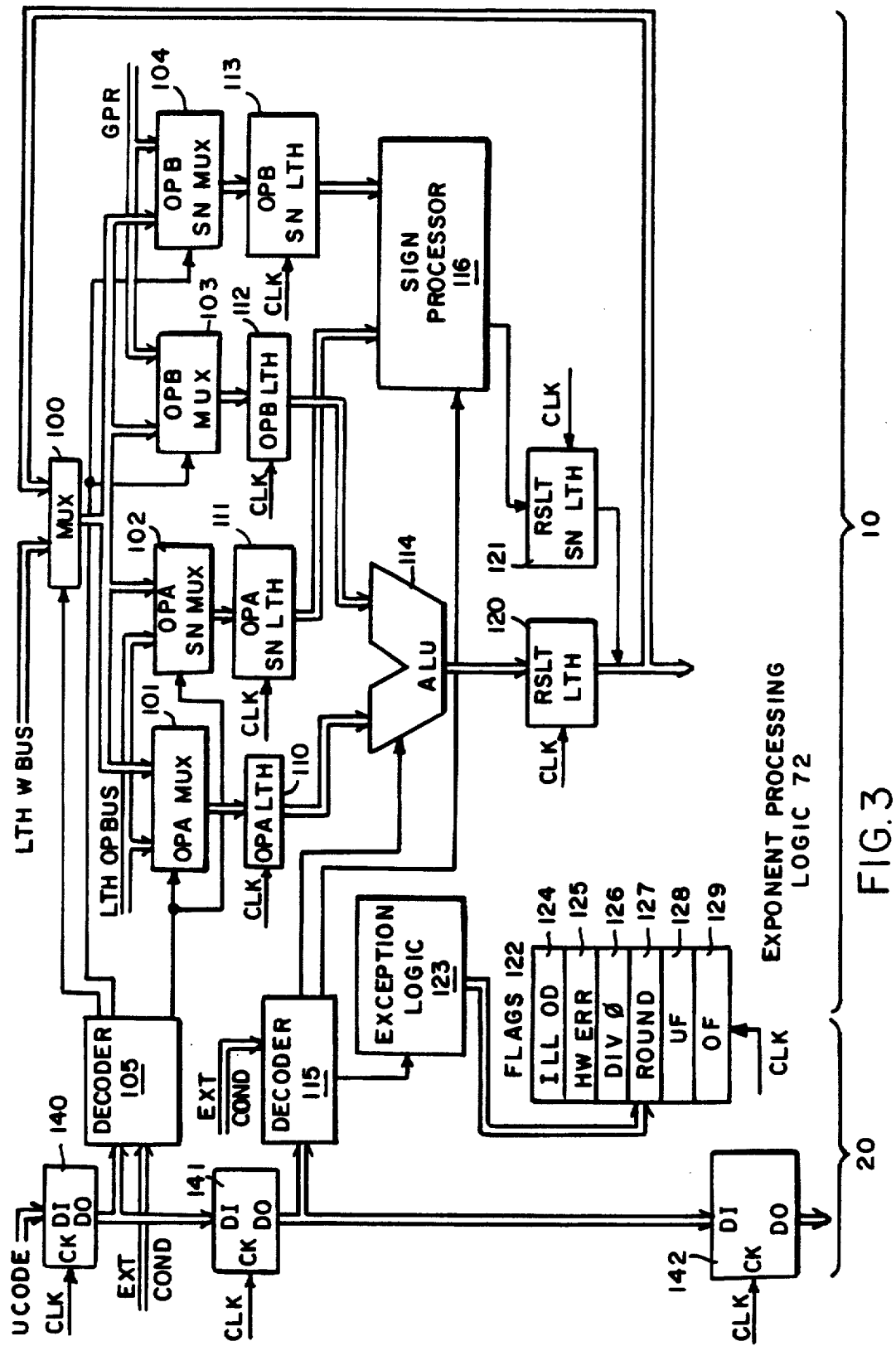
FIG. 3 is a block diagram of a portion of the central processing unit depicted in FIG. 2A, constructed in accordance with the invention.

With reference to FIG. 3, the exponent processing module 72 can receive two operands, denoted "OPA" and "OPB" and specifically the exponent portion of the operands. Operand OPA can comprise an exponent from operand bus latch 73 or WRITE bus latch 74. OPB can comprise an exponent from the WRITE bus latch 74 or the general purpose registers 75. The exponent from WRITE bus latch 74 are received through a multiplexer 100 and coupled to one input of each of two pairs of multiplexers, one pair comprising an operand OPA multiplexer 101 and operand OPA sign multiplexer 102, and the other pair comprising an operand OPB multiplexer 103, and an operand OPB sign multiplexer 104. The remaining input of each of multiplexers 101 and 102 are connected to receive the exponent from the operand bus latch 73. The remaining input of each of multiplexers 103 and 104 are connected to receive an exponent from the general purpose registers 75. All of multiplexers 100 through 104 are under control of a decoder 105.

The exponent selected by multiplexers 101 and 102 are latched in an OPA latch 110 and an OPA sign latch 111, and the exponent selected by multiplexers 103 and 104 are latched in an OPB latch 112 and an OPB sign latch 113. The latches 110 through 113 store the respective exponents in response to a CLK timing signal. The contents of latches 110 and 112 are coupled to respective inputs of an arithmetic and logic unit 114, which operates under control of control signals from a decoder 115. The contents of the sign latches 111 and 113 are coupled to a sign processor 116, which also operates under control of control signals from decoder 115. The output of arithmetic and logic unit 114 is stored in a result latch 120 and the output of the sign processor 116 is stored in a result sign latch 121 in response to the CLK timing signal. The contents of the latches 120 and 121 may be coupled to the WRITE bus latch 74, and are also coupled to the second input of multiplexer 100.

In addition, the floating point accelerator processor 54 includes a set of condition flag latches 122 which latch signals from exception logic 123 in response to the CLK timing signal. Exception logic 123 is also controlled by decoder 115, and the conditions of the flags indicate the conditions of processing of the information stored contemporaneously in result latch 120 and result sign latch 121. The flag latches 122 include a flag 124 which indicates if one of the operands OPA or OPB are not in the format depicted in FIG. 2B, a flag 125 which indicates that an error occurred during processing through exponent processing logic 72, a flag 126 which indicates when, during a division operation, the divisor operand is zero, a flag 172 which indicates whether rounding is required, and flags 128 and 129 which indicates whether underflow or overflow occurred during processing by exponent processing logic 72. The execution unit 53 uses the contents of the flag latches in further processing after the floating point accelerator processor 54 has finished processing a floating point instruction.

Multiplexers 100 through 105, latches 110 through 113, arithmetic and logic unit 114, sign processor 116, latches 120 and 121, and exception logic 123 and flags 122 together form the data processing path 10 of exponent processing module 72. The exponent processing logic 72 also includes a control path 20 including the aforementioned decoders 105 and 115, as well as latches 140, 141 and 142. The microinstruction from control store 76 is initially stored in latch 140 in response to the CLK timing signal. The decoder 105 receives the microinstruction stored in latch 140 and uses them, in combination with external condition signals to generate control signals which control multiplexers 100 through 04. Such external condition signals may constitute, for example, in connection with multiplexers 101 and 102, a signal indicating whether the operand is in operand bus latch 73 or write bus latch 74.

Contemporaneously with latching of the OPA and OPB exponents in latches 110 through 113, the microinstruction in latch 140 is shifted to latch 141. The microinstruction is then received in decoder 115, which uses the microinstruction in combination with external condition signals to generate control signals which control arithmetic and logic unit 114, sign processor 116 and exception logic 123. The external condition signals used by decoder 115 may, for example, identify the floating point instruction to be performed by floating point accelerator processor 54. For example, if the floating point instruction requires a multiplication or division, the arithmetic and logic unit 14 will be enabled to add or subtract the exponents. If, however, the operation is an add or subtract, the arithmetic and logic unit 114, along with the sign processor 116, generates signals which enable circuitry in addition module 70 (FIG. 2A) to align the fraction 64 of the two operands so as to enable the addition or subtraction to take place. Additionally, the decoder 115 enables the exception logic 123 to generate the flag signals which are stored in flag latches 122.

It should be noted that while decoder 115 is processing the microinstruction in latch 141, decoder 105 can be processing another microinstruction that was latched in latch 140. Thus, the decoder 105 can enable the connected portions of the data processing path 10 of exponent processing module 72 to perform an operation while decoder 115 is enabling its connected portion of the data path to be performing operations required of it by microinstruction stored in latch 141.

Similarly, while decoder 115 is enabling the connected portion of the data processing path 10, circuitry downstream of latch 141, for example, latch 142 and associated decoding circuitry (not shown) can also control circuitry in the data processing path (also not shown), in connection with a preceding microinstruction. It can be seen that the invention thus enables the circuit depicted in FIG. 3 to pipeline the processing of data through the data processing path 10.

Furthermore, the invention enables the reduction in the number of control signals required in a microinstruction. Decoders 105 and 115 receive the same microinstruction in successive processing stages. The respective decoders 105 and 115, and the applicable external condition signals together generate the control signals which enable the connected circuit elements of the data path to process the microinstruction. Accordingly, each microinstruction from control store 76 (FIG. 2A) is not required to have one control signal for controlling each of the circuit elements depicted in the data processing path 10 in FIG. 3, during every processing cycle. This reduces the number of control signals required to form the microinstructions, and hence, reduces the number of bits in each microinstruction in control store 76. This also serves to reduce the number of control lines required to connect control store 76 to the processing modules 70, 71 and 72.

The foregoing description has been limited to a specific embodiment of this invention. It will be apparent, however, that the invention can be practiced in data processing systems having diverse basic construction or in systems that use different internal circuitry than is disclosed in this specification with the attainment of some or all of the advantages of the invention. Therefore, it is the object of the appended claims to cover all such variations and modifications as come within the true spirit and scope of the invention.

What is claimed as new and desired to be secured by Letters Patent of the United States is:

1. A control system for controlling a digital data processor which processes digital data in accordance with processing instructions in sequential processing cycles, each processing cycle being performed in one of a plurality of serially connected processing modules, said processor generating condition signals representative of processing conditions in the processor, said control system comprising:
   A. a like plurality of serially connected processing instruction receiving means, each receiving means being associated with one of said processing modules, said receiving means receiving the processing instruction and coupling it to the succeeding receiving means in synchronism with the transfer of said data through said processing modules, and
   B. a like plurality of decoding means each connected to one of said receiving means to one of said processing modules and at least one of said decoding means being connected to receive said condition signals, for decoding the processing instruction and said condition signals and generating control signals to control the connected processing module.

2. A control system as defined in claim 1 wherein said instruction receiving means comprise a series of latches connected seriatum, the processing instruction being shifted from an upstream latch to a downstream latch in each processing cycle.

3. A digital data processor which processes digital data in accordance with processing instructions in sequential processing cycles, each processing cycle being performed in one of a plurality of serially connected processing modules, said processor generating condition signals representative of processing conditions in the processor, said control system comprising:
   A. a plurality of serially connected processing modules, each of which receives data from an upstream processing module, performs a processing operation on the data, and transmits the data to the downstream processing module;
   B. a like plurality of processing instruction storage means connected serially, each storage means being associated with one of said processing modules, said storage means receiving the processing instruction and coupling it to the next successive receiving means in synchronism with the transfer of data through said processing modules, and
   C. a like plurality of decoding means each connected to one of said receiving means to one of said processing modules and at least one of said decoding means being connected to receive said condition signals, for decoding the processing instructions and said condition signals and generating control signals to control the connected processing module.

4. A processor as defined in claim 3 wherein said instruction receiving means comprise a series of latches connected seriatum, the processing instruction being shifted from an upstream latch to a downstream latch in each processing cycle.

5. A processor as defined in claim 3 in which data are supplied from a plurality of data sources, one of said processing modules including means for selecting the data sources and for transmitting the data receiving from said data sources for processing in a downstream module.

6. A processor as defined in claim 3 wherein one of said processing modules includes means for performing an arithmetic operation on the data received from an upstream processing module.

7. A processor as defined in claim 3 wherein one of said processing modules includes means for storing indication means for indicating selected results of processing of the data received from an upstream module.

8. A processor as defined in claim 3 wherein each of said processing modules includes:
(a) processing means connected to a decoding means for performing a processing operation under control of the connected decoding means and for transmitting processed data; and
(b) a processed data storage means connected to said processing means for storing the processed data transmitted therefrom, said processed data storage means storing the processed data in synchronism with the transfer of the processing instruction which controls the processing the the associated data between the processing instruction storage means.

9. A digital data processor for executing instructions comprising an operation code identifying an operation to be performed on operands from selected ones of a plurality of operand source means, the processor generating condition signals representative of processing conditions in the processor and executing each instruction in accordance with a series of microinstructions from a microcode control store and said condition signals, the processor comprising:
A. data path means including:
(i) an operating selection stage connected to the plurality of operand source means for selecting and storing operands during a processing cycle,
(ii) an operand processor stage connected to the operand selection stage for processing the operands and storing the processed operands during a processing cycle; and
B. microcode control means connected to said operand selection stage and said operand processor stage for enabling said respective stages to perform predetermined operations in execution of the microinstruction during a plurality of successive processing cycles, including:
(i) microcode selection and transmitting means for receiving the operation code of the instruction, for identifying a series of microinstructions in response thereto, and for iteratively transmitting a microinstruction from the identified series,
(ii) a plurality of microcode storage means connected serially for iteratively receiving the microinstructions from said microcode selection and transmitting means or an upstream microinstruction storage means and for transferring the microinstruction to the next downstream storage means at the end of each cycle, each of said microcode storage means being associated with one of said processing stages, and
(iii) a like plurality of decoding means each connected to one of said receiving means to one of said stages in said data path means, at least one of said decoding means being connected to receive said condition signals, said decoding means decoding the microinstruction and said condition signals and generating control signals to control the operations of the connected stage.

10. A processor as defined in claim 9 in which at least one of said decoding means further receives a condition signal from said processor indicating the occurrence of selected conditions in said processor, said decoding means using said condition signal with said microinstruction to control the connected stage.

11. A processor as defined in claim 9 wherein said microinstruction storage means comprise a series of latches connected seriatum, the microinstruction being shifted from an upstream latch to a downstream latch in each processing cycle.

12. A processor as defined in claim 9 wherein said operand processor stage includes means for performing an arithmetic operation on the data received from an upstream processing module.

13. A processor as defined in claim 9 wherein said operand processor stage includes means for storing indication means for indicating selected results of processing of the operand received from said operand selection stage.

14. A processor as defined in claim 9 wherein each of said operand selection stage and operand processor stage includes:
(a) processing means connected to a decoding means for performing a processing operation for generating a processed operand under control of the connected decoding means and for transmitting the processed operand during said processing operation; and
(b) a processed operand storage means connected to said processing means for storing the processed operand transmitted therefrom, said storage means operating in synchronism with the transfer of the microinstruction which controls the processing by the respective stage between the microinstruction storage means.

15. An exponent processor for processing exponent portions of operand words in a floating point processor in a digital data processing system, the exponent operands of the operand words being provided from a plurality of operand sources, and being processed in connection with an instruction, said exponent processor generating condition signals representative of processor conditions therein, the instruction identifying a series of microinstruction which define the procedure for processing the operand, the exponent processor comprising:
A. a data path comprising:
(i) an exponent operand selection stage for selecting the sources of the operands from among the operand sources and for storing the exponent operands from the selected sources during a processing cycle, and (ii) an exponent processing stage connected to said exponent operand selection stage for processing the exponent operands and storing the processed exponent operands during a processing cycle, and B. microcode control means connected to said exponent operand selection stage and said exponent operand processor stage for enabling said respective stages to perform predetermined operations in execution of the microinstruction during a plurality of successive processing cycles, including:

(i) microcode selection and transmitting means for receiving the operation code of the instruction, for identifying a series of microinstructions in response thereto, and for iteratively transmitting a microinstruction from the identified series, (ii) a plurality of microinstruction storage means connected serially each for iteratively receiving the microinstructions from either said microinstruction transmitting means or an upstream microinstruction storage means and for transferring the microinstruction to the next downstream storage means at the end of each cycle, each of said microcode storage means being associated with one of said exponent operand selection stage or said exponent processing stage, and (iii) a like plurality of decoding means each connected to one of said microinstruction storage means, to one of said stages in said data path means and at least one of said decoding means being connected to receive said condition signals, for decoding the microinstruction and said condition signals and generating control signals to control the operations of the connected stage.

16. An exponent processor as defined in claim 15 in which said operand exponent selection stage includes a multiplexer connected to a plurality of exponent operand sources and further includes a plurality of exponent operand storage means, each of which receives an exponent operand, said multiplexer coupling an exponent operand from one of a plurality of exponent operand sources to one of the exponent operand storage means in response to a control signal from the associated decoding means.

17. An exponent processor as defined in claim 16 in which the decoding means associated with said exponent selection stage includes means for receiving condition signals from at least one of the exponent operand sources which indicates the presence of an exponent operand therein, said decoding means including means for using the condition signals in connection with selecting the source of the exponent operands.

18. An exponent processor as defined in claim 16 in which said exponent processing stage includes an arithmetic and logic unit connected to said exponent operand storage means for performing arithmetic operations on the stored exponent operand in response to control signals from the associated decoding means.

19. An exponent processor as defined in claim 18 in which all of said said exponent operand storage means include sign storage means for storing a sign signal, said exponent operand processing means including sign processing means for generating a processed sign signal in response to control signals from the associated decoding means, said exponent operand processing means further including means for storing the output of said sign processing means.

20. An exponent processor as defined in claim 19 in which said exponent operand processing means includes exception processing means for generating condition signals in response to the presence of selected conditions during processing of an exponent operand, said exception processing means including means for storing the condition signals contemporaneously with the storage of processed exponent operands in said exponent processing stage.

* * * * *